United States Patent
Zhang et al.

(10) Patent No.: US 8,625,046 B2
(45) Date of Patent: Jan. 7, 2014

(54) LIQUID CRYSTAL DISPLAY AND BACKLIGHT MODULE THEREOF

(75) Inventors: Yanxue Zhang, Shenzhen (CN); Yi-Cheng Kuo, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 111 days.

(21) Appl. No.: 13/375,482

(22) PCT Filed: Jun. 24, 2011

(86) PCT No.: PCT/CN2011/076303
§ 371 (c)(1),
(2), (4) Date: Nov. 30, 2011

(87) PCT Pub. No.: WO2012/139334
PCT Pub. Date: Oct. 18, 2012

(65) Prior Publication Data
US 2012/0262644 A1    Oct. 18, 2012

(51) Int. Cl.
*G02F 1/1333* (2006.01)

(52) U.S. Cl.
USPC ............... 349/58; 349/65; 362/97.2; 362/633

(58) Field of Classification Search
USPC .............. 349/58, 65; 362/615, 632, 633, 634, 362/97.1, 97.2, 97.4
See application file for complete search history.

(56) References Cited

U.S. PATENT DOCUMENTS

| 7,651,257 B2 * | 1/2010 | Shin ............................... 362/633 |
| 7,688,398 B2 * | 3/2010 | Kim ............................... 349/60 |
| 2006/0187373 A1 | 8/2006 | Hu |
| 2010/0085502 A1 | 4/2010 | Yen et al. |

FOREIGN PATENT DOCUMENTS

| CN | 101051152 A | 10/2007 |
| CN | 201359236 Y | 12/2009 |
| CN | 101886772 A | 11/2010 |
| CN | 101956940 A | 1/2011 |

* cited by examiner

*Primary Examiner* — Thoi Duong
(74) *Attorney, Agent, or Firm* — Cheng-Ju Chiang

(57) ABSTRACT

A liquid crystal display (LCD) and a backlight module thereof is disclosed. The backlight module comprises a backplate and a light guide plate. The backplate comprises a bottom wall and a sidewall disposed at a periphery of the bottom wall and extending perpendicular to the bottom wall. The light guide plate is supported on the bottom wall. At least one positioning bent-piece is disposed to be bent from the bottom wall, and the positioning bent-piece abuts against a side edge of the light guiding plate to position the light guide plate. In this way, by using the positioning bent-piece disposed on the bottom wall of the backplate to position the light guide plate, the need of disposing an additional positioning structure on the light guide plate is eliminated, so the product yield of light guide plates can be improved.

16 Claims, 3 Drawing Sheets

LIQUID CRYSTAL DISPLAY AND BACKLIGHT MODULE THEREOF

FIELD OF THE INVENTION

The present disclosure generally relates to the technical field of liquid crystal displaying, and more particularly, to a liquid crystal display (LCD) and a backlight module thereof.

BACKGROUND OF THE INVENTION

Owing to development of the science and technology, liquid crystal displays (LCDs) have found wide application in people's daily life. Conventional edge-lit LCDs all require use of a light guide plate, and the light guide plate must be positioned onto a backplate. Generally, in conventional positioning practices, a tab or some other positioning structure is formed at a side edge of the light guide plate by use of a computerized numerical control (CNC) machine tool, and a positioning groove or a positioning post is formed in the backplate. Thus, the light guide plate and the backplate can be assembled together through engagement of the tab and the positioning groove or positioning post. However, this adds to the manufacturing complexity of the light guide plate and reduces the product yield of light guide plates.

SUMMARY OF THE INVENTION

An objective of the present disclosure is to provide a liquid crystal display (LCD) and a backlight module thereof that can improve the product yield of light guide plates by eliminating the need of disposing an additional positioning structure on the light guide plates.

To achieve the aforesaid objective, an embodiment of the present disclosure provides a backlight module, which comprises a backplate and a light guide plate. The backplate comprises a bottom wall and a sidewall disposed at a periphery of the bottom wall and extending perpendicular to the bottom wall. The light guide plate is supported on the bottom wall. At least one positioning bent-piece is disposed to be bent from the bottom wall, and the positioning bent-piece abuts against a side edge of the light guiding plate to position the light guide plate. The backlight module further comprises a plastic frame adapted to receive the positioning bent-piece and supported on a top surface of the light guide plate. The plastic frame comprises a plastic frame body, a first partition and a second partition. The first partition extends from the plastic frame body towards the bottom wall at a side of the positioning bent-piece that is near the light guide plate, and is disposed to be supported on the top surface of the light guide plate. The second partition extends from the plastic frame body towards the bottom wall at the other side of the positioning bent-piece that is opposite to the light guide plate, and the positioning bent-piece is inserted between the first partition and the second partition.

According to a preferred embodiment of the present disclosure, the plastic frame further comprises a first supporting wall extending from the plastic frame body towards the bottom wall and connected with the second partition, and the first supporting wall is supported on the bottom wall.

According to a preferred embodiment of the present disclosure, the plastic frame further comprises a second supporting wall extending from the plastic frame body towards the bottom wall and abutting against an inner edge of the sidewall, and the second supporting wall is further supported on the bottom wall.

To achieve the aforesaid objective, an embodiment of the present disclosure provides a backlight module, which comprises a backplate and a light guide plate. The backplate comprises a bottom wall and a sidewall disposed at a periphery of the bottom wall and extending perpendicular to the bottom wall. The light guide plate is supported on the bottom wall. At least one positioning bent-piece is disposed to be bent from the bottom wall, and the positioning bent-piece abuts against a side edge of the light guiding plate to position the light guide plate.

According to a preferred embodiment of the present disclosure, the backlight module further comprises a plastic frame adapted to receive the positioning bent-piece and supported on a top surface of the light guide plate.

According to a preferred embodiment of the present disclosure, the plastic frame comprises a plastic frame body, a first partition and a second partition. The first partition extends from the plastic frame body towards the bottom wall at a side of the positioning bent-piece that is near the light guide plate, the second partition extends from the plastic frame body towards the bottom wall at the other side of the positioning bent-piece that is opposite to the light guide plate, and the positioning bent-piece is inserted between the first partition and the second partition.

According to a preferred embodiment of the present disclosure, the plastic frame further comprises a third partition and a fourth partition extending from the plastic frame body towards the bottom wall and connected with the first partition and the second partition respectively, and the positioning bent-piece is further inserted between the third partition and the fourth partition.

According to a preferred embodiment of the present disclosure, the first partition is disposed to be supported on the top surface of the light guide plate.

According to a preferred embodiment of the present disclosure, the bottom wall is formed with a notch at a periphery of the positioning bent-piece, and the second partition, the third partition and the fourth partition extend through the notch to be flush with a bottom surface of the bottom wall.

According to a preferred embodiment of the present disclosure, the plastic frame further comprises a first supporting wall extending from the plastic frame body towards the bottom wall and connected with the second partition, and the first supporting wall is supported on the bottom wall.

According to a preferred embodiment of the present disclosure, the plastic frame further comprises a second supporting wall extending from the plastic frame body towards the bottom wall and abutting against an inner edge of the sidewall, and the second supporting wall is further supported on the bottom wall.

To achieve the aforesaid objective, an embodiment of the present disclosure provides a liquid crystal display (LCD) comprising a backlight module. The backlight module comprises a backplate and a light guide plate. The backplate comprises a bottom wall and a sidewall disposed at a periphery of the bottom wall and extending perpendicular to the bottom wall. The light guide plate is supported on the bottom wall. At least one positioning bent-piece is disposed to be bent from the bottom wall, and the positioning bent-piece abuts against a side edge of the light guiding plate to position the light guide plate.

According to a preferred embodiment of the present disclosure, the backlight module further comprises a plastic frame adapted to receive the positioning bent-piece and supported on a top surface of the light guide plate.

According to a preferred embodiment of the present disclosure, the plastic frame comprises a plastic frame body, a first partition and a second partition. The first partition extends from the plastic frame body towards the bottom wall at a side of the positioning bent-piece that is near the light guide plate, the second partition extends from the plastic frame body towards the bottom wall at the other side of the positioning bent-piece that is opposite to the light guide plate, and the positioning bent-piece is inserted between the first partition and the second partition.

According to a preferred embodiment of the present disclosure, the plastic frame further comprises a third partition and a fourth partition extending from the plastic frame body towards the bottom wall and connected with the first partition and the second partition respectively, and the positioning bent-piece is further inserted between the third partition and the fourth partition.

According to a preferred embodiment of the present disclosure, the first partition is disposed to be supported on the top surface of the light guide plate.

According to a preferred embodiment of the present disclosure, the bottom wall is formed with a notch at a periphery of the positioning bent-piece, and the second partition, the third partition and the fourth partition extend through the notch to be flush with a bottom surface of the bottom wall.

According to a preferred embodiment of the present disclosure, the plastic frame further comprises a first supporting wall extending from the plastic frame body towards the bottom wall and connected with the second partition, and the first supporting wall is supported on the bottom wall.

According to a preferred embodiment of the present disclosure, the plastic frame further comprises a second supporting wall extending from the plastic frame body towards the bottom wall and abutting against an inner edge of the sidewall, and the second supporting wall is further supported on the bottom wall.

According to a preferred embodiment of the present disclosure, the LCD further comprises a liquid crystal panel and a front frame. The plastic frame further comprises a third supporting wall and a fourth supporting wall extending from the plastic frame body and away from the bottom wall. The liquid crystal panel is supported on the plastic frame body. The front frame is supported on the third supporting wall and the fourth supporting wall and is fixed with the sidewall of the backplate to sandwich the liquid crystal panel, the plastic frame and the light guide plate.

The present disclosure has the following benefits: because a positioning bent-piece disposed on a bottom wall of the backplate is used in the present disclosure to position the light guide plate, the need of disposing an additional positioning structure on the light guide plate is eliminated. Accordingly, the product yield of light guide plates is improved as compared to the prior art.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

Figure 1:
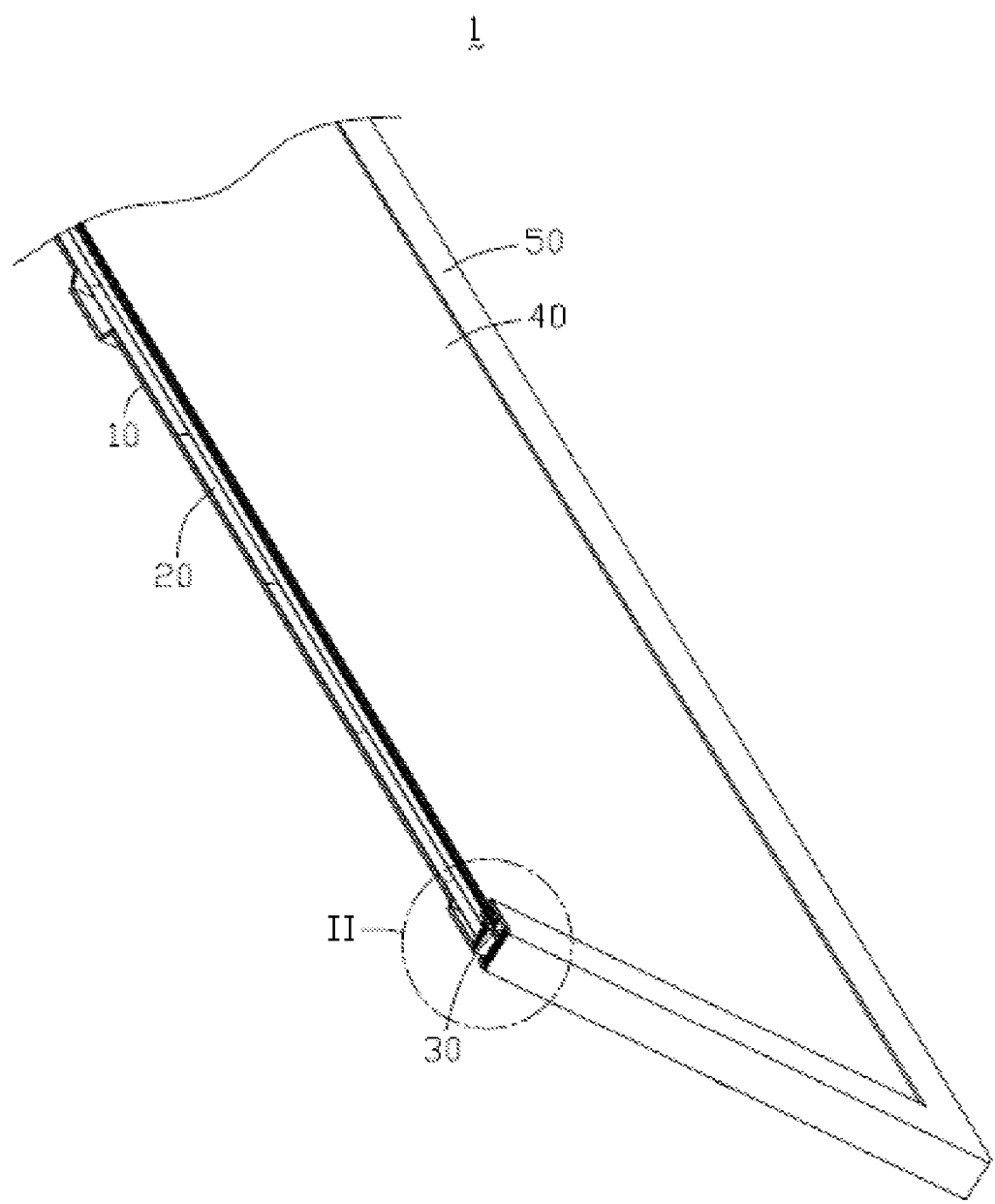
FIG. 1 is a schematic partial cross-sectional and perspective view of an embodiment of a liquid crystal display (LCD) according to the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Referring to FIG. 1, there is shown a schematic partial cross-sectional and perspective view of an embodiment of a liquid crystal display (LCD) according to the present disclosure. The LCD 1 of this embodiment comprises a backplate 10, a light guide plate 20, a plastic frame 30, a liquid crystal panel 40 and a front frame 50.

Figure 2:
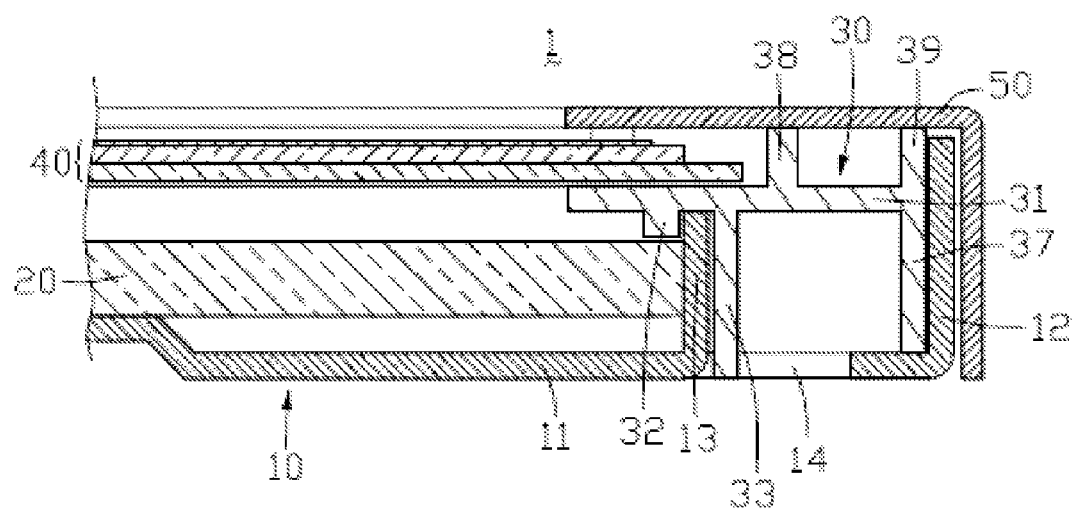
FIG. 2 is a schematic cross-sectional view of a part II of the LCD shown in FIG. 1.

Referring to FIG. 2, there is shown a schematic cross-sectional view of a part II of the LCD shown in FIG. 1. As shown in FIG. 2, the backplate 10 comprises a bottom wall 11 and a sidewall 12 disposed at a periphery of the bottom wall 11 and extending perpendicular to the bottom wall 11. The light guide plate 20 is disposed in a receiving space defined by the bottom wall 11 and the sidewall 12, and is supported on the bottom wall 11. In this embodiment, at least one positioning bent-piece 13 is disposed to be bent from the bottom wall 11. The positioning bent-piece 13 abuts against a side edge of the light guide plate 20 to position the light guide plate 20 in a horizontal direction. In a preferred embodiment, the backplate 10 may be made of a metal sheet through stamping, and the light guide plate 20 may be made of acryl or some other transparent material through injection molding. In this embodiment, the light guide plate 20 is positioned by using the at least one positioning bent-piece 13 to abut against the side edge of the light guide plate 20, so the light guide plate 20 may be formed into a standard rectangular structure directly to eliminate the need of disposing an additional positioning structure on the light guide plate 20. Thus, the product yield of light guide plates 20 is improved.

As shown in FIG. 2, the plastic frame 30 receives the at least one positioning bent-piece 13 and is supported on a top surface of the light guide plate 20 to form a backlight module. Specifically, the plastic frame 30 comprises a plastic frame body 31, a first partition 32 and a second partition 33. The first partition 32 extends from the plastic frame body 31 towards the bottom wall 11 at a side of the positioning bent-piece 13 that is near the light guide plate 20. The second partition 33 extends from the plastic frame body 31 towards the bottom wall 11 at the other side of the positioning bent-piece 13 that is opposite to the light guide plate 20. Thus, the positioning bent-piece 13 can be inserted between the first partition 32 and the second partition 33 to position the plastic frame 30. The first partition 32 is disposed to be supported on the top surface of the light guide plate 20 and, consequently, cooperates with the bottom wall 11 to sandwich the light guide plate 20 therebetween for positioning the light guide plate 20 in a vertical direction.

Figure 3:
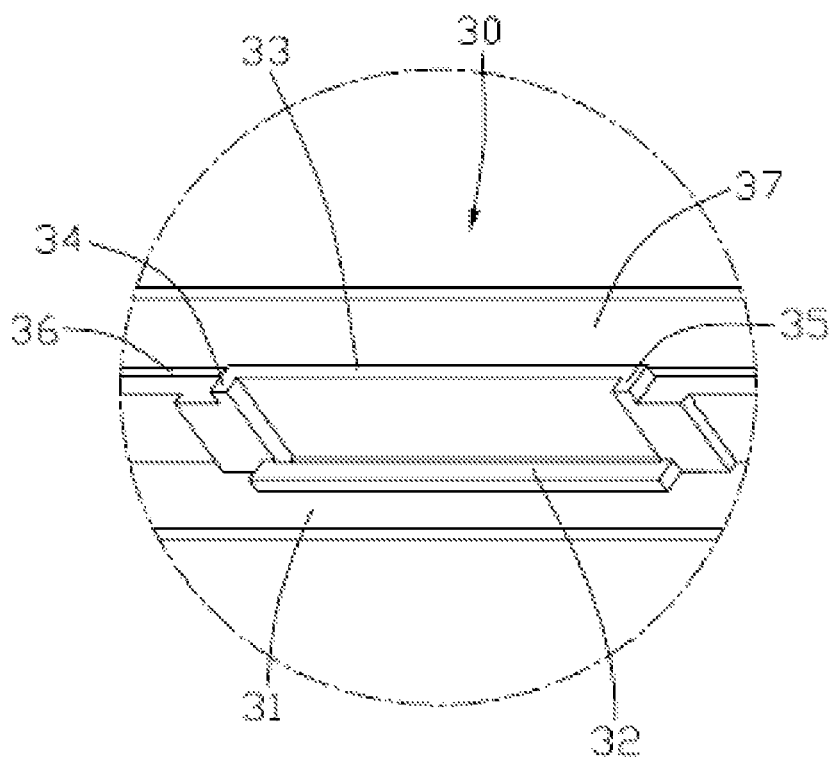
FIG. 3 is a schematic partial enlarged view of a plastic frame of the LCD shown in FIG. 1.

Referring to FIG. 3, there is shown a schematic partial enlarged view of a plastic frame 30 of the LCD shown in FIG. 1. As shown in FIG. 3, the plastic frame 30 further comprises a third partition 34 and a fourth partition 35. The third partition 34 and the fourth partition 35 extend from the plastic frame body 31 towards the bottom wall 11 and connect with the first partition 32 and the second partition 33 respectively so that the positioning bent-piece 13 can be further inserted between the third partition 34 and the fourth partition 35. As a result, the positioning bent-piece 13 is positioned in a positioning space formed by the first partition 32, the second partition 33, the third partition 34 and the fourth partition 35 to prevent movement of the plastic frame 30 relative to the bottom wall 11. Additionally, the plastic frame 30 further comprises a first supporting wall 36 extending from the plastic frame body 31 towards the bottom wall 11 and connecting with the second partition 33.

As shown in FIG. 2, the bottom wall 11 is formed with a notch 14 at a periphery of the positioning bent-piece 13. The second partition 33, the third partition 34 and the fourth partition 35 extend through the notch 14 to be flush with a bottom surface of the bottom wall 11. Meanwhile, the first supporting wall 36 is supported on the bottom wall 11 to improve the strength of the plastic frame 30.

As shown in FIG. 2, the plastic frame 30 further comprises a second supporting wall 37, a third supporting wall 38 and a fourth supporting wall 39. The second supporting wall 37 extends from the plastic frame body 31 towards the bottom wall 11 and abuts against an inner edge of the sidewall 12, and is further supported on the bottom wall 11. The third supporting wall 38 and the fourth supporting wall 39 extend from the plastic frame body 31 away from the bottom wall 11. The fourth supporting wall 39 also abuts against an inner edge of the sidewall 12. In a preferred embodiment, the plastic frame 30 may be made of a plastic material through injection molding.

As shown in FIG. 2, the liquid crystal panel 40 is supported on the plastic frame body 31, and the front frame 50 is supported on the third supporting wall 38 and the fourth supporting wall 39 and is fixed with the sidewall 12 of the backplate 10 so as to sandwich the liquid crystal panel 40, the plastic frame 30 and the light guide plate 20 between the front frame 50 and the backplate 10.

In this way, by using the positioning bent-piece 13 disposed on the bottom wall 11 of the backplate 10 to position the light guide plate 20, the need of disposing an additional positioning structure on the light guide plate 20 is eliminated, so the product yield of light guide plates 20 can be improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A backlight module comprising a backplate and a light guide plate, the backplate comprising a bottom wall and a sidewall that is disposed at a periphery of the bottom wall and extend perpendicular to the bottom wall, the light guide plate being supported on the bottom wall, wherein at least one positioning bent-piece is disposed to be bent from the bottom wall, and the positioning bent-piece abuts against a side edge of the light guiding plate to position the light guide plate; the backlight module further comprises a plastic frame adapted to receive the positioning bent-piece and supported on a top surface of the light guide plate; the plastic frame comprises a plastic frame body, a first partition and a second partition, and the first partition extends from the plastic frame body towards the bottom wall at a side of the positioning bent-piece that is near the light guide plate and is disposed to be supported on the top surface of the light guide plate; the second partition extends from the plastic frame body towards the bottom wall at the other side of the positioning bent-piece that is opposite to the light guide plate, and the positioning bent-piece is inserted between the first partition and the second partition.

2. The backlight module of claim 1, wherein the plastic frame further comprises a first supporting wall extending from the plastic frame body towards the bottom wall and connected with the second partition, and the first supporting wall is supported on the bottom wall.

3. The backlight module of claim 2, wherein the plastic frame further comprises a second supporting wall extending from the plastic frame body towards the bottom wall and abutting against an inner edge of the sidewall, and the second supporting wall is further supported on the bottom wall.

4. A backlight module comprising a backplate and a light guide plate, the backplate comprising a bottom wall and a sidewall that is disposed at a periphery of the bottom wall and extend perpendicular to the bottom wall, the light guide plate being supported on the bottom wall, wherein at least one positioning bent-piece is disposed to be bent from the bottom wall, and the positioning bent-piece abuts against a side edge of the light guiding plate to position the light guide plate;
   wherein the backlight module further comprises a plastic frame adapted to receive the positioning bent-piece and supported on a top surface of the light guide plate;
   wherein the plastic frame comprises a plastic frame body, a first partition and a second partition, the first partition extends from the plastic frame body towards the bottom wall at a side of the positioning bent-piece that is near the light guide plate, the second partition extends from the plastic frame body towards the bottom wall at the other side of the positioning bent-piece that is opposite to the light guide plate, and the positioning bent-piece is inserted between the first partition and the second partition.

5. The backlight module of claim 4, wherein the plastic frame further comprises a third partition and a fourth partition extending from the plastic frame body towards the bottom wall and connected with the first partition and the second partition respectively, and the positioning bent-piece is further inserted between the third partition and the fourth partition.

6. The backlight module of claim 5, wherein the first partition is disposed to be supported on the top surface of the light guide plate.

7. The backlight module of claim 6, wherein the bottom wall is formed with a notch at a periphery of the positioning bent-piece, and the second partition, the third partition and the fourth partition extend through the notch to be flush with a bottom surface of the bottom wall.

8. The backlight module of claim 6, wherein the plastic frame further comprises a first supporting wall extending from the plastic frame body towards the bottom wall and connected with the second partition, and the first supporting wall is supported on the bottom wall.

9. The backlight module of claim 8, wherein the plastic frame further comprises a second supporting wall extending from the plastic frame body towards the bottom wall and abutting against an inner edge of the sidewall, and the second supporting wall is further supported on the bottom wall.

10. A liquid crystal display (LCD) comprising a backlight module, wherein the backlight module comprises a backplate and a light guide plate, the backplate comprises a bottom wall and a sidewall that is disposed at a periphery of the bottom wall and extend perpendicular to the bottom wall, the light guide plate is supported on the bottom wall, at least one positioning bent-piece is disposed to be bent from the bottom wall, and the positioning bent-piece abuts against a side edge of the light guiding plate to position the light guide plate;

wherein the backlight module further comprises a plastic frame adapted to receive the positioning bent-piece and supported on a top surface of the light guide plate;

wherein the plastic frame comprises a plastic frame body, a first partition and a second partition, the first partition extends from the plastic frame body towards the bottom wall at a side of the positioning bent-piece that is near the light guide plate, the second partition extends from the plastic frame body towards the bottom wall at the other side of the positioning bent-piece that is opposite to the light guide plate, and the positioning bent-piece is inserted between the first partition and the second partition.

11. The LCD of claim 10, wherein the plastic frame further comprises a third partition and a fourth partition extending from the plastic frame body towards the bottom wall and connected with the first partition and the second partition respectively, and the positioning bent-piece is further inserted between the third partition and the fourth partition.

12. The LCD of claim 11, wherein the first partition is disposed to be supported on the top surface of the light guide plate.

13. The LCD of claim 12, wherein the bottom wall is formed with a notch at a periphery of the positioning bent-piece, and the second partition, the third partition and the fourth partition extend through the notch to be flush with a bottom surface of the bottom wall.

14. The LCD of claim 12, wherein the plastic frame further comprises a first supporting wall extending from the plastic frame body towards the bottom wall and connected with the second partition, and the first supporting wall is supported on the bottom wall.

15. The LCD of claim 14, wherein the plastic frame further comprises a second supporting wall extending from the plastic frame body towards the bottom wall and abutting against an inner edge of the sidewall, and the second supporting wall is further supported on the bottom wall.

16. The LCD of claim 12, further comprising a liquid crystal panel and a front frame, wherein the plastic frame further comprises a third supporting wall and a fourth supporting wall extending from the plastic frame body and away from the bottom wall, the liquid crystal panel is supported on the plastic frame body, and the front frame is supported on the third supporting wall and the fourth supporting wall and is fixed with the sidewall of the backplate to sandwich the liquid crystal panel, the plastic frame and the light guide plate.

* * * * *